United States Patent
Seibert et al.

(10) Patent No.: US 11,912,946 B2
(45) Date of Patent: Feb. 27, 2024

(54) FUEL ENDOTHERMIC REACTION TO COOL A LOAD

(71) Applicant: The Government of the United States, as represented by the Secretary of the Army, Washington, DC (US)

(72) Inventors: Michael Seibert, Bel Air, MD (US); Richard Scenna, Baltimore, MD (US); Terry DuBois, Forest Hill, MD (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 186 days.

(21) Appl. No.: 17/215,498

(22) Filed: Mar. 29, 2021

(65) Prior Publication Data

US 2022/0306943 A1    Sep. 29, 2022

(51) Int. Cl.
*C10G 9/40* (2006.01)
*C01B 3/34* (2006.01)
*F02C 1/05* (2006.01)

(52) U.S. Cl.
CPC ............ *C10G 9/40* (2013.01); *C01B 3/34* (2013.01); *F02C 1/05* (2013.01); *C01B 2203/0233* (2013.01); *C01B 2203/06* (2013.01); *C01B 2203/0883* (2013.01); *C10G 2300/4081* (2013.01); *F05D 2220/764* (2013.01)

(58) Field of Classification Search
CPC .... C10G 9/40; C10G 2300/4081; C01B 3/34; C01B 2203/0233; C01B 2203/06; C01B 2203/0883; C01B 2203/0266; C01B 2203/066; C01B 2203/1642; F02C 1/05; F02C 7/224; F05D 2220/764
USPC ..................................... 60/736–739
See application file for complete search history.

(56) References Cited

U.S. PATENT DOCUMENTS

| | | | | |
|---|---|---|---|---|
| 2,663,142 A * | 12/1953 | Walter | ...................... | F02K 7/12 60/260 |
| 2,979,293 A * | 4/1961 | Mount | ................. | B64D 13/006 62/7 |
| 3,142,541 A * | 7/1964 | Presbie | ...................... | F02K 9/68 422/208 |
| 5,845,481 A * | 12/1998 | Briesch | ................... | F02C 7/224 60/776 |
| 6,588,212 B1 * | 7/2003 | Wallace | ................... | F02C 3/22 60/39.12 |
| 7,066,973 B1 * | 6/2006 | Bentley | ................. | B01J 8/0465 422/198 |
| 8,931,283 B2 * | 1/2015 | Khan | ...................... | F23R 3/28 60/737 |

(Continued)

*Primary Examiner* — Hoang M Nguyen
(74) *Attorney, Agent, or Firm* — Ronald Krosky

(57) ABSTRACT

Various embodiments that pertain to fuel processing are described. A fuel processor can produce an endothermic reaction that cools a substance and produces a processed fuel from a raw fuel. A generator can employ the processed fuel to produce an electricity. The generator can supply the electricity to a load that uses the electricity to function. The load can become hot due to its functioning and can benefit from being cooled. The substance cooled by the fuel processor can cool load and in the process the substance can rise in temperature. This warmer substance can be transferred to the fuel processor to be cooled again and this cycle can continue. Further, the fuel processor can use the warmer substance to achieve the endothermic reaction.

20 Claims, 8 Drawing Sheets

(56) References Cited

U.S. PATENT DOCUMENTS

| | | | |
|---|---|---|---|
| 2011/0061392 A1* | 3/2011 | Kendrick | F23C 6/047 60/737 |
| 2012/0122017 A1* | 5/2012 | Mills | G21B 3/00 429/218.2 |
| 2016/0346755 A1* | 12/2016 | DuBois | B01J 12/007 |

* cited by examiner

FUEL ENDOTHERMIC REACTION TO COOL A LOAD

GOVERNMENT INTEREST

The innovation described herein may be manufactured, used, imported, sold, and licensed by or for the Government of the United States of America without the payment of any royalty thereon or therefor.

BACKGROUND

In various devices, heat disbursement can be an important design feature. If hardware portions of the device become too hot, then these portions can suffer from a host of problems such as not functioning properly or operational failure. In one example, a fin heat sink can be used to disperse heat into the air. The fin heat sink can create a greater surface area for heat to exit the device or a hardware portion of the device into the air. However, as heat loads become greater and devices more complex, it may not be practical to build a fin heat sink with a surface area large enough to effectively remove heat from the device or the hardware portion of the device into the air.

SUMMARY

In one embodiment, a fuel controller, that is at least partially hardware, comprises an input component, an exchange component, a reaction component, and an output component. The input component can be configured to manage reception of a quantity of a raw fuel and the exchange component can be configured to cause engagement with a heated substance at a first temperature. The reaction component can be configured to cause the raw fuel to experience an endothermic reaction through employment of the heated substance such that the raw fuel is converted into a processed fuel and the output component can be configured to cause output of the processed fuel. The endothermic reaction can cause the heated substance to cool to a second temperature lower than the first temperature.

In another embodiment, a system comprises a reaction chamber and a generator. The reaction chamber can be configured to experience an endothermic reaction for a raw fuel that produces a fuel resultant, the endothermic reaction can be achieved by a rise in a temperature of the raw fuel caused by exposure of the raw fuel to a heated substance. The generator can be configured to generate an electricity from fuel resultant.

In yet another embodiment, a method, performed at least in part by a fuel processor, can comprise receiving a raw fuel at the fuel processor and receiving a substance at a first temperature at the fuel processor. The method can also comprise employing the substance at the first temperature to cause an endothermic reaction associated with the raw fuel at the fuel processor such that the raw fuel converts into a resultant fuel. In addition, the method can comprise cooling the substance to a second temperature through the endothermic reaction at the fuel processor and outputting the resultant fuel from the fuel processor.

BRIEF DESCRIPTION OF THE DRAWINGS

Incorporated herein are drawings that constitute a part of the specification and illustrate embodiments of the detailed description. The detailed description will now be described further with reference to the accompanying drawings as follows:

Multiple figures can be collectively referred to as a single figure. For example, FIG. 1 illustrates two subfigures—FIG. 1A and FIG. 1B. These can be collectively referred to as 'FIG. 1.'

DETAILED DESCRIPTION

Figure 1A:
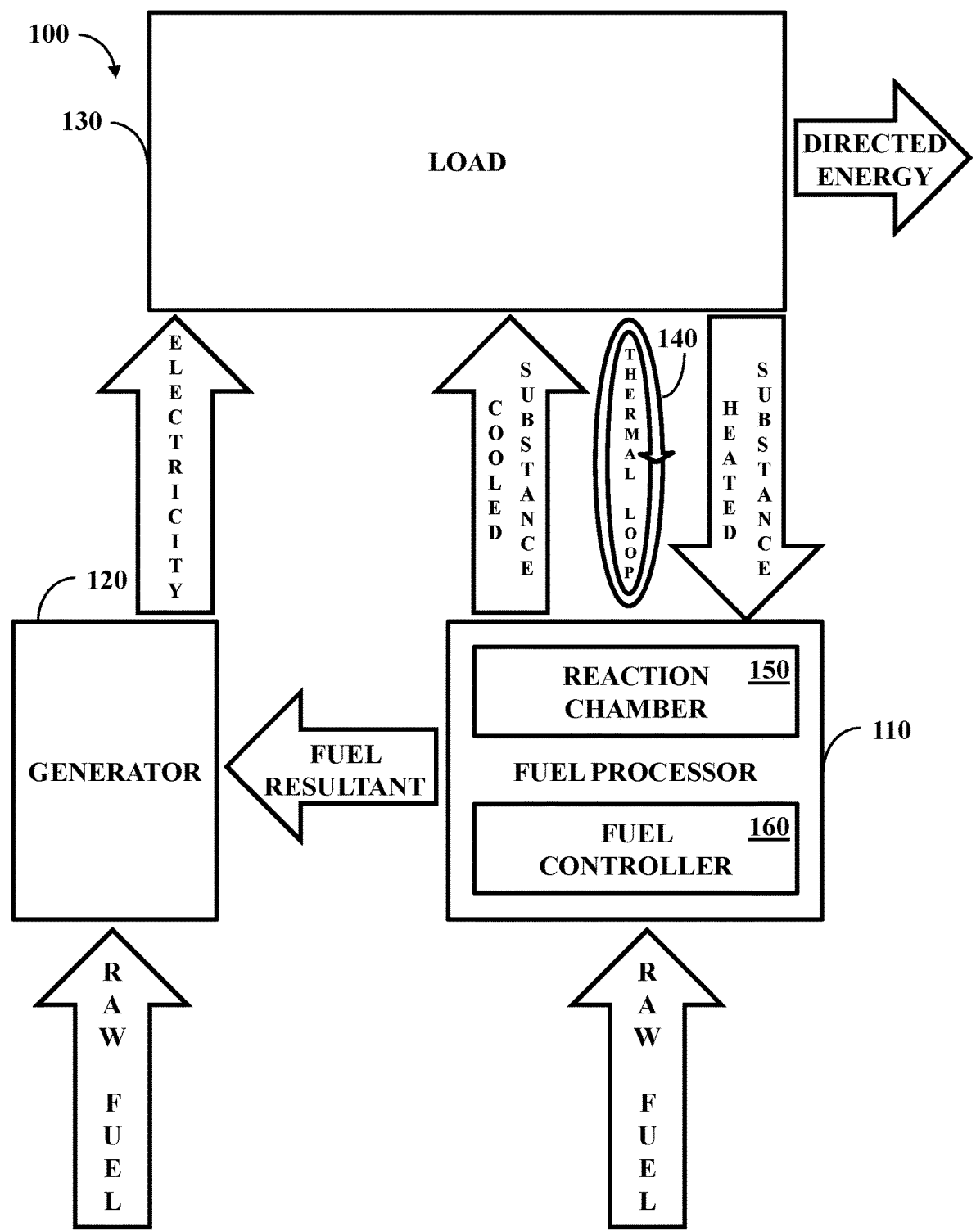
FIG. 1A illustrates one embodiment of an environment comprising a fuel processor, a generator, a load, and a loop.

When a laser load operates, the laser load can become hot. This heat can cause the laser load to not operate properly as well as cause damage to the laser load. Therefore, the laser load can be cooled to improve operation and mitigate heat damage. One way to cool the laser load is refrigerant from a heat exchanger transferring heat to ambient air. While this may be effective, a heat exchanger transferring heat to ambient air can be large and heavy which limits the mobility of the laser load and/or an apparatus associated with the laser load.

To reduce the size of the heat exchanger or eliminate the heat exchanger, heat can be transferred from the laser load to a unit that can benefit from heat. An example of such a unit can be an endothermic reaction-based fuel processor.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

Figure 1B:
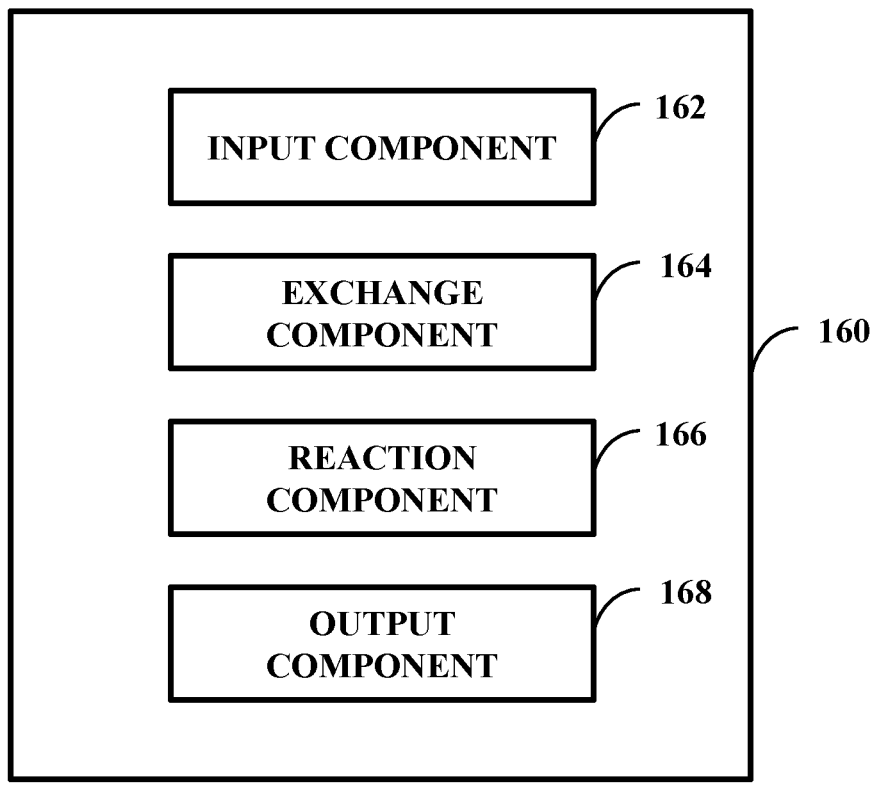
FIG. 1B illustrates one embodiment of a fuel controller comprising an input component, an exchange component, a reaction component, and an output component.

FIG. 1A illustrates one embodiment of an environment comprising a fuel processor 110, a generator 120, a load 130, and a thermal loop 140, with the fuel processor 110 comprising a reaction chamber 150 and a fuel controller 160. FIG. 1B illustrates one embodiment of the fuel controller 160 comprising an input component 162, an exchange component 164, a reaction component 166, and an output component 168.

The reaction chamber 150 can be configured to experience an endothermic reaction for a raw fuel that produces a fuel resultant. The input component 162 can be configured to manage reception of a quantity of the raw fuel in the reaction chamber 150. The exchange component 164 can be configured to cause engagement with a heated substance at a first temperature and the reaction component 166 can be configured to cause the raw fuel to experience the endothermic reaction through employment of the heated substance such that the raw fuel is converted into a processed fuel. For the raw fuel experiencing the endothermic reaction, the fuel itself can directly experience the reaction or another reaction can occur in the reaction chamber, such as steam reformation, that heats the fuel to be converted to the processed fuel and thus the experience is indirect.

In one example, the loop 140 can supply the fuel processor 110 with a heat through the heated substance (e.g., transferred by direct contact, conduction, transfer of a liquid coolant, or transfer of a vapor coolant) and the input component 162 can obtain the quantity of the raw fuel from a reservoir and supply it to the reaction chamber 150. The heated substance can be at a high temperature and cause the raw fuel to warm in the reaction chamber 150 (e.g., the exchange component 164 being tubing that coils around the reaction chamber 150). The endothermic reaction can be achieved (e.g., at least in part) by a rise in a temperature of the raw fuel caused by exposure of the raw fuel to the heated substance, with the reaction component 166 being a medium (e.g., chamber wall) that warms the fuel, such as a transfer material that transfers heat from the tubing to the inner chamber. Simply warming the raw fuel may not cause the endothermic reaction, so the reaction component 166 can cause this reaction, such as engaging the raw fuel with a catalyst while the raw fuel is heated. As one example, the endothermic reaction can comprise thermal cracking to produce a hydrogen-based (e.g., hydrogen-based itself or lower hydrocarbon-based) fuel.

The endothermic reaction can produce at least two practical results—to cause the raw fuel to be converted into a processed fuel as a fuel resultant and to cool the substance by consuming heat (and in turn cooling the load 130 by way of the substance). Addressing the processed fuel first, the output component 168 can output the processed fuel, such as to the generator 120 that is configured to generate an electricity from the fuel resultant. The generator 120 can produce the electricity from the processed fuel alone or from a combination of raw fuel and the processed fuel.

The processed fuel may not be enough for the generator 120 to produce the desired electricity. Therefore, the generator 120 can employ a combination of processed fuel and raw fuel to produce the desired electricity. The processed fuel and the raw fuel can be of different quantities. In one example, the output component 168 can indicate to the generator 120 the amount of processed fuel the fuel processor 110 is delivering. The generator 120 can employ a component to determine how much electricity it will generate and how much raw fuel should be obtained to produce that electricity. The generator 120 can obtain the raw fuel from the same reservoir that the fuel processor 110 draws from or from a different reservoir.

In one example, the generator 120 is supplied directly with a first raw fuel, such as JP-8. The fuel processor 110 is supplied with a second raw fuel, such as methanol, which is processed via the endothermic reaction and the product of that reaction is supplied to the generator 120 as the processed fuel. The generator 120 can use the raw fuel and the processed fuel to generate the electricity, such as when the processed fuel is of a greater portion than the raw fuel, equal portion, or lessor portion.

The generator 120 can supply the electricity to the load 130. The load 130 can be configured to function with the electricity. In one example, the load 130 can be a laser that emits a laser beam as directed energy. The load 130 can produce the laser beam through employment of the electricity.

When the load 130 functions, it can produce a relatively large amount of heat as a byproduct. Therefore, the load 130 can produce the substance at a first temperature that is a higher temperature than a standing temperature due to being heated from operation of the load 130. The loop 140 can be configured to transfer the heated substance between the load 130 and the fuel processor 110 (e.g., to the reaction chamber 150 by way of coils that circulate the reaction chamber and vice versa). In one embodiment, the fuel processor 110 is integrated into the load 130 and the loop 140 functions to transfer heat and cooling by way of induction (e.g., a fuel repository wall functions as the substance).

The fuel processor 110 can employ the heated substance to cause the endothermic reaction as discussed above. The endothermic reaction can cool the substance to a second temperature lower than the first temperature such that it is a cooled substance.

When the load 130 functions, production of the relatively large amount of heat can be damaging to the load itself; therefore it can be beneficial to cool the load 130, which can be done with the cooled substance. The loop 140 can be a conduit that transfers the cooled substance to the load 130 to cool the load. When the load 130 functions again, the substance can be re-warmed and transferred back to the fuel processor 110 via the loop 140 for re-cooling and return.

If the cooled substance is cool enough, then the environment 100 can function without a heat exchanger transferring heat to air, reducing the weight and size of the environment (e.g., when encapsulated within a housing). However, if the cooled substance is not cool enough, then the environment 100 can use a heat exchanger transferring heat to air, such as one smaller than would be appropriate absent the endothermic reaction. Therefore, the loop 140 can comprise a first loop and a second loop. The second loop can supply a refrigerant to the load 130 from a heat exchanger. The load 130 can employ the cooled substance and the refrigerant to bring its temperature down.

Figure 2:
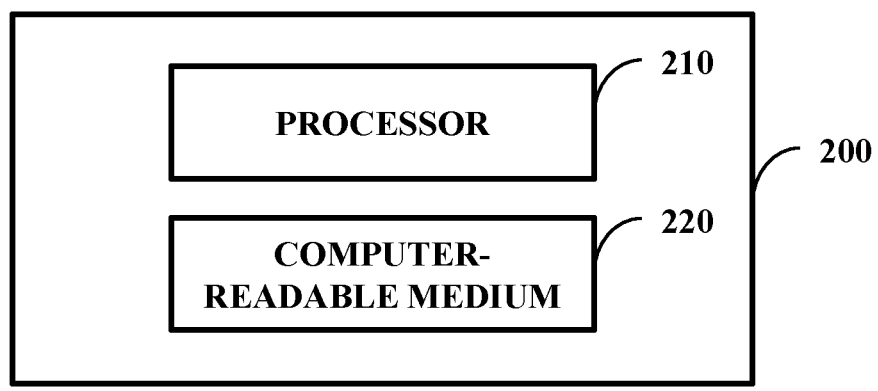
FIG. 2 illustrates one embodiment of a system comprising a processor and a computer-readable medium.

FIG. 2 illustrates one embodiment of a system 200 comprising a processor 210 and a computer-readable medium 220 (e.g., non-transitory computer-readable medium). In one embodiment, the computer-readable medium 220 is communicatively coupled to the processor 210 and stores a command set executable by the processor 210 to facilitate operation of at least one component disclosed herein (e.g., the exchange component 164 of FIG. 1). In one embodiment, at least one component disclosed herein (e.g., the reaction component 166 of FIG. 1) can be implemented, at least in part, by way of non-software, such as implemented as hardware by way of the system 200. In one embodiment, the computer-readable medium 220 is configured to store processor-executable instructions that when executed by the processor 210, cause the processor 210 to perform at least part of a method disclosed herein (e.g., at least part of one of the methods 300-700 discussed below).

Figure 3:
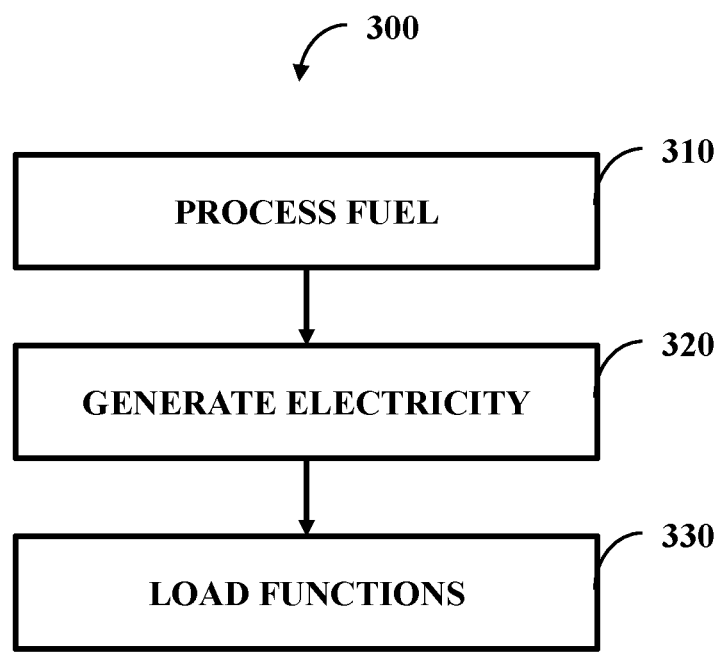
FIG. 3 illustrates one embodiment of a method comprising three actions.

FIG. 3 illustrates one embodiment of a method 300 comprising three actions 310-330. At 310, the fuel processor 110 of FIG. 1 can process a raw fuel, such as through employing thermal cracking to produce a hydrogen-based fuel. At 320, the generator 120 of FIG. 1 can generate electricity from the processed fuel. At 330, the load 130 of FIG. 1 can function with the electricity. This functioning can warm a medium transferred to the fuel processor 110 of FIG. 1, with the fuel processor 110 of FIG. 1 using the warmed medium to process the raw fuel.

Figure 4:
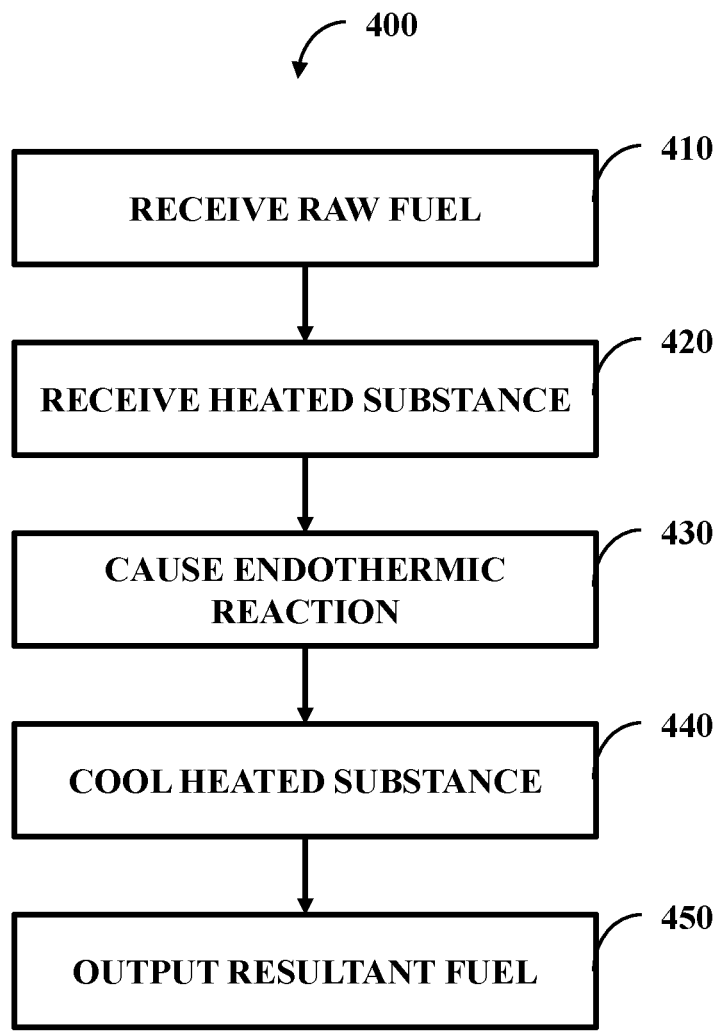
FIG. 4 illustrates one embodiment of a method comprising five actions.

FIG. 4 illustrates one embodiment of a method 400 comprising five actions 410-450, which can be considered one example of action 310 of FIG. 3. At 410, the fuel processor 110 of FIG. 1 can receive the raw fuel and at 420 can receive a substance at a first temperature. At 430, the substance is employed at the first temperature to cause an endothermic reaction associated with the raw fuel such that the raw fuel converts into a resultant fuel. This associated reaction can be causing a reaction of the raw fuel itself or causing a reaction of another substance that causes the raw fuel to convert. The endothermic reaction can cool the substance to a second temperature at 440 and the resultant fuel can be outputted at 450, such as outputted to the generator 120 of FIG. 1.

Figure 5:
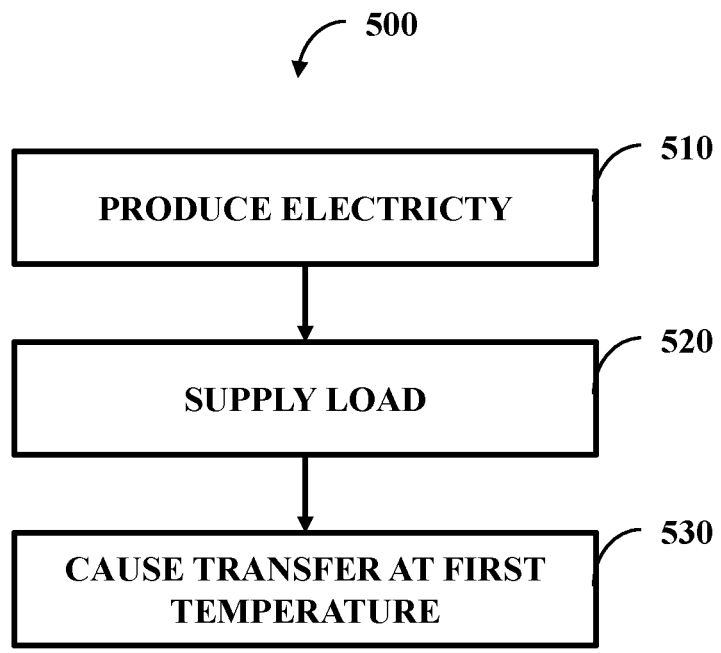
FIG. 5 illustrates one embodiment of a method comprising three actions.

FIG. 5 illustrates one embodiment of a method 500 comprising three actions 510-530. At 510, the generator 120 of FIG. 1 can produce an electricity from the resultant fuel and at 520 the generator 120 of FIG. 1 can supply the load 130 of FIG. 1 with the electricity. The generator 120 of FIG. 1 can produce the electricity from the resultant fuel exclusively or from the resultant fuel and a portion of the raw fuel. In one example, the portion of the raw fuel the generator 120 of FIG. 1 uses to generate the electricity is smaller than the portion of raw fuel employed in conversion to the resultant fuel.

With this electricity, the load 130 of FIG. 1 can operate. Load operation can produce the substance at the first temperature. The load 130 of FIG. 1 can cause transfer of the substance at the first temperature to the fuel processor 110 of FIG. 1.

Figure 6:
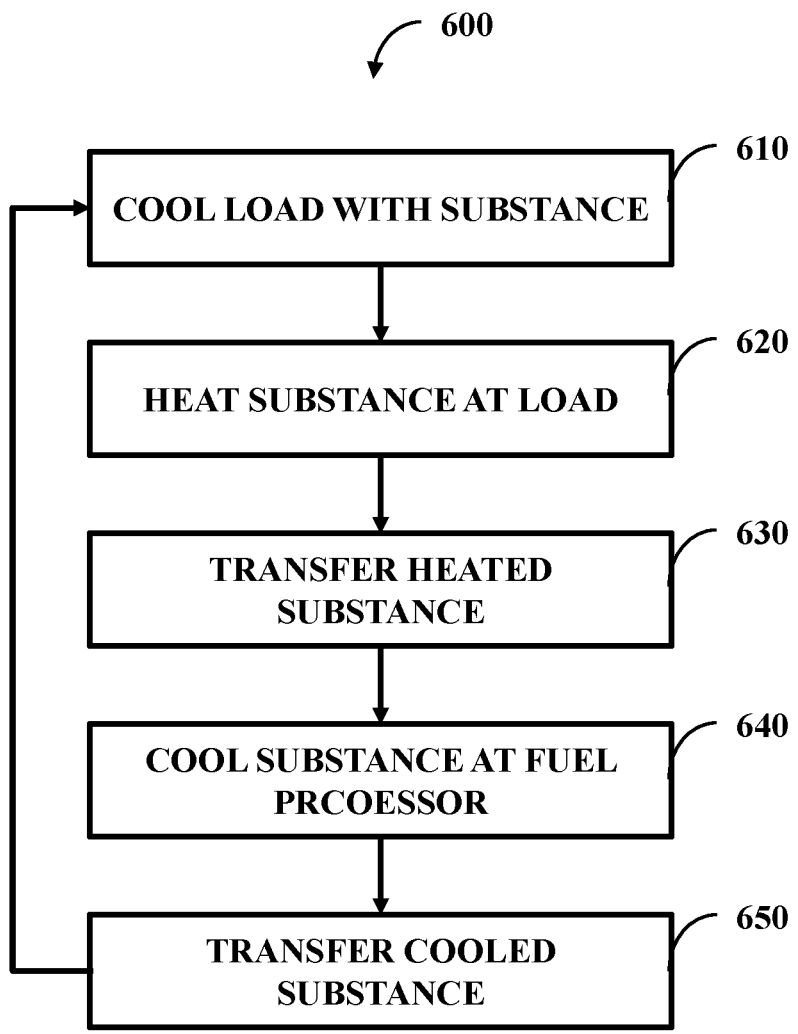
FIG. 6 illustrates one embodiment of a method comprising five actions.

FIG. 6 illustrates one embodiment of a method 600 comprising five actions 610-650. At 610, the load 130 of FIG. 1 can cool with the substance, but as the load 130 of FIG. 1 functions, the load 130 of FIG. 1 produces heat and heats the substance at 620. This heated substance can transfer from the load 130 of FIG. 1 to the fuel processor 110 of FIG. 1 by way of the loop 140 of FIG. 1. At 640, the heated substance cools in response to its heat being absorbed by the endothermic reaction down to a second temperature and, at 650, the cooled substance at the second temperature returns to the load 130 of FIG. 1 by way of the loop 140 of FIG. 1. The method 600 of FIG. 1 can restart at 610, with the cooling the load 130 of FIG. 1 with the substance at the second temperature, with the load 130 of FIG. 1 being powered again causing the substance at the second temperature to rise in temperature (e.g., back up to the first temperature). This can allow for a continuous cycle of heating and cooling.

Figure 7:
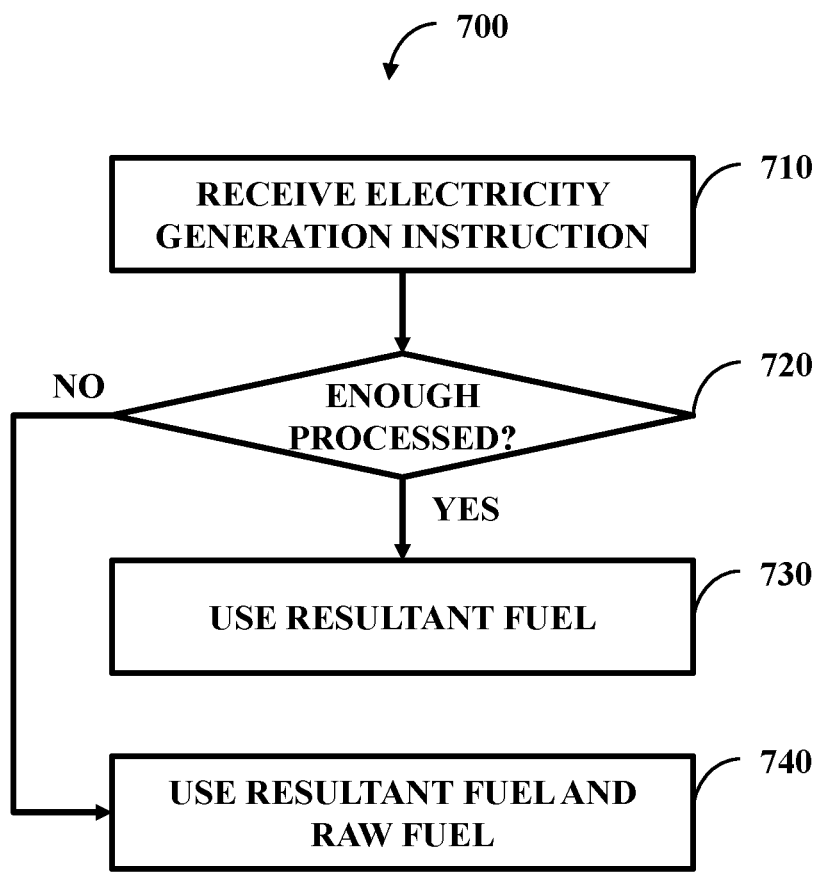
FIG. 7 illustrates one embodiment of a method comprising four actions.

FIG. 7 illustrates one embodiment of a method 700 comprising four actions 710-740. The method 700 can be an example of how logic of the generator 120 of FIG. 1 functions, such as when an energy generation instruction is received at 710. When the instruction is received, a check 720 can determine if there is enough fuel resultant. If there is enough resultant fuel, then the method 700 can go to 730 where the resultant fuel is used to generate the electricity. If there is not enough resultant fuel, then the check 720 can go to 730 where the resultant fuel and the raw fuel are used to generate the electricity.

In one embodiment, a generator controller can manage fuel usage. In one example, instructions can be varied, such as a first instruction requesting X amount of electricity and a second instruction requesting Y amount of electricity, with X and Y being different number values. Depending on how much electricity is to be generated, the generator controller can determine how much fuel is likely to be used. In one example, the resultant fuel can be more efficient than the raw fuel, so less is used to generate electricity; in view of this, resultant fuel can be preferred. The generator controller can cause obtainment of an anticipated amount of fuel (e.g., from generator reservoirs or outside reservoirs) and cause use of the fuel to produce the electricity.

The generator controller can work along with other controllers, such as the fuel controller 160 of FIG. 1. In one example, when the generator controller receives (e.g., collects and processes) the instruction, the generator controller can identify how much resultant fuel should be sufficient. A request can be provided to the fuel controller 160 of FIG. 1 to produce that amount of fuel resultant.

While the methods disclosed herein are shown and described as a series of blocks, it is to be appreciated by one of ordinary skill in the art that the methods are not restricted by the order of the blocks, as some blocks can take place in different orders.

It can be appreciated that endothermic reactions of fuel can function as a method of rejecting heat to cool directed energy weapons or other high power electronics (e.g., functioning as the load 130 of FIG. 1). These weapons benefit from the dissipation of large quantities of heat which can be a limiting factor in their development and deployment. Heat exchangers, such as radiators or condensers, can be used to allow rejecting of heat to air. However, these heat exchangers can be relatively large and heavy.

To reduce the size and weight of the heat exchanger or to eliminate the heat exchanger completely, fuel reformation can be practiced. Fuel reformation can be the conversion of higher hydrocarbon fuels to a hydrogen rich gas stream as a fuel resultant. Steam reforming can be a type of reformation that uses steam to break the hydrocarbons found in fuel to lower hydrocarbons, carbon monoxide, carbon dioxide, and water. Steam reforming can be endothermic, employing an external heat source such as the heated substance.

Endothermic reaction of the fuel can be a method to reduce the size and weight of the heat rejection equipment. Heat can be transferred to the fuel in an endothermic reaction such as steam reforming in a smaller envelope than what can be used for heat rejection to air. The reaction absorbs heat and converts the fuel to hydrogen, carbon monoxide, lower hydrocarbons, etc. These gases are burned in the generator 120 of FIG. 1. Burning the gases in the generator 120 of FIG. 1 can reduce or eliminate heat rejection to air.

Removal or reduction of the heat exchanger, and in turn reduction or elimination of heat rejection to air, can make an overall system smaller. In one example, using the heat from the laser to drive an endothermic reaction in the fuel such as steam reforming can increase the potential heat absorbed by a factor of 17. For example, a 60 kW laser with an efficiency of 43% can function such that 80 kWth should be dissipated. To dissipate this heat with a heat exchanger, an 80 kWth/25 ton air cooled condenser can be employed, such as one that weighs 1200 lbs with a volume of 175 ft3.

In contrast, a steam reformer (e.g., part of the fuel processor 110 of FIG. 1) absorbing 80 kWth can be designed at less than 1 ft$^3$, a significant savings in weight and volume as well as allowing for an increased duty cycle. The heat absorbed by the fuel is not rejected to air because the modified fuel is supplied to the engine. The hydrogen and lower hydrocarbons can be inducted through an air intake of the generator 120 of FIG. 1 when implemented as an engine.

In an example implementation of aspects disclosed herein, the endothermic fuel processor uses the substance, converting the fuel to hydrogen and lower hydrocarbons. These product gases are then consumed by the generator 120 of FIG. 1. In one example, 80% of the fuel passes through the fuel processor, and 20% is still provided directly to the generator.

In an example practice, 0.41 kg/min (300 kW$_{th}$) of raw fuel can enter an endothermic fuel processor sized at about 1 ft$^3$. The endothermic reaction can take 79.5 kW$_{th}$ of waste heat and produce processed fuel supplied to the generator 120 of FIG. 1. The generator 120 of FIG. 1 can take the processed fuel and 0.17 kg/min (123 kW$_{th}$) of raw fuel and, at 33% efficiency, produce 139.5 kW of electricity. The load 130 of FIG. 1, functioning at 43% efficiency, can take the electricity and produce 60 kW of directed energy to a target and the 79.5 kW$_{th}$ of waste heat.

On example, of the endothermic reaction can be thermal cracking: the breakdown of long hydrocarbon chains at high temperatures. This reaction could be used instead of reforming to absorb the heat. It would produce shorter chain hydrocarbons that would fuel the engine.

What is claimed is:

1. A fuel controller, that is at least partially hardware, comprising:
   an input component configured to manage reception of a quantity of a raw fuel;
   an exchange component configured to cause engagement with a heated substance at a first temperature;
   a reaction component configured to cause the raw fuel to experience an endothermic reaction through employment of the heated substance such that the raw fuel is converted into a processed fuel; and
   an output component configured to cause output of the processed fuel,
   where the endothermic reaction causes the heated substance to cool to a second temperature lower than the first temperature,
   where the quantity of the raw fuel is a first quantity,
   where the output component causes output of the processed fuel to a generator,
   where the generator employs the processed fuel and a second quantity of the raw fuel to produce an electricity,
   where the electricity powers a load,
   where the load being powered produces the heated substance being at the first temperature, and
   where the heated substance at the second temperature is returned to the load.

2. The fuel controller of claim 1,
   where the processed fuel is hydrogen-based.

3. The fuel controller of claim 2,
   where the endothermic reaction comprises thermal cracking.

4. The fuel controller of claim 2,
   where the endothermic reaction comprises steam reforming.

5. A system, comprising:
   a reaction chamber configured to experience an endothermic reaction for a raw fuel that produces a fuel resultant, the endothermic reaction is achieved by a rise in a temperature of the raw fuel caused by exposure of the raw fuel to a heated substance;
   a generator configured to generate an electricity from fuel resultant;
   a load configured to function with the electricity such that the load produces the heated substance; and
   a loop configured to transfer the heated substance between the load and the reaction chamber,
   where the endothermic reaction cools the heated substance into a cooled substance,
   where the cooled substance cools the load,
   where the load functioning causes the cooled substance to rise in temperature to a re-heated substance, and
   where the loop supplies the re-heated substance to the reaction chamber.

6. The system of claim 5,
   where the loop is a first loop,
   where the load employs a refrigerant from a second loop to function, and
   where the cooled substance and the refrigerant cool the load.

7. The system of claim 5,
   where the reaction chamber is configured to experience the endothermic reaction for a first portion of the raw fuel,
   where the generator configured to generate an electricity from the fuel resultant and a second portion of the raw fuel, and
   where the fuel resultant is greater than the second portion of the raw fuel when the generator generates the electricity.

8. The system of claim 5,
   where the fuel resultant is hydrogen-based and
   where the endothermic reaction comprises thermal cracking.

9. The system of claim 5,
   where the fuel resultant is hydrogen-based and
   where the endothermic reaction comprises steam reforming.

10. The system of claim 6,
where the reaction chamber is configured to experience the endothermic reaction for a first portion of the raw fuel,
where the generator configured to generate an electricity from the fuel resultant and a second portion of the raw fuel, and
where the fuel resultant is greater than the second portion of the raw fuel when the generator generates the electricity.

11. The system of claim 10,
where the fuel resultant is hydrogen-based and
where the endothermic reaction comprises thermal cracking.

12. The system of claim 10,
where the fuel resultant is hydrogen-based and
where the endothermic reaction comprises steam reforming.

13. The fuel controller of claim 1,
where the exchange component comprises tubing that coils around a reaction chamber.

14. The fuel controller of claim 2,
where the reaction component is configured to cause the raw fuel to experience the endothermic reaction at a reaction chamber that is part of a fuel processor,
where the exchange component comprises tubing that coils around the reaction chamber,
where a physical loop functions as a pathway upon which the heated substance travels between the fuel processor and the load,
where the heated substance at the at the second temperature travels from the fuel processor to the load by way of the physical loop, and
where the heated substance at the at the first temperature travels from the load to the fuel processor by way of the physical loop.

15. The fuel controller of claim 14,
where the fuel processor is integrated into the load and
where the physical loop is a wall such that heat transfer occurs though induction.

16. A system, that is at least partially hardware, comprising:
an input component configured to manage reception of a substance at a first temperature, in association with a reaction chamber, by way of a physical loop;
a reaction component configured to cause a first endothermic reaction for a first raw fuel that produces a first fuel resultant, the first endothermic reaction is achieved by a rise in a temperature of the first raw fuel caused by exposure of the first raw fuel to the substance at the first temperature and the first endothermic reaction causes the substance to go from the first temperature to a second temperature with the second temperature being cooler than the first temperature;
an output component configured to manage supply of the substance to a load at the second temperature by way of the physical loop; and
a generation component configured to enable generation of an electricity from first fuel resultant such that the load is powered with the electricity from the first fuel resultant, the load being powered causes the load to function and causes the substance to change from the second temperature to a third temperature, with the third temperature being warmer than the second temperature; and
where the input component is configured to cause the substance at the third temperature to cycle back, by way of the physical loop, to the reaction chamber.

17. The system of claim 16,
where the reaction component is configured to cause a second endothermic reaction for a second raw fuel that produces a second fuel resultant, the second endothermic reaction is achieved by a rise in a temperature of the second raw fuel caused by exposure of the second raw fuel to the substance at the third temperature and the second endothermic reaction causes the substance to go from the third temperature to a fourth temperature with the fourth temperature being cooler than the third temperature,
where the output component is configured to manage supply of the substance to the load at the fourth temperature by way of the physical loop; and
where the generation component is configured to enable generation of an electricity from second fuel resultant such that the load is powered with the electricity from the second fuel resultant, the load being powered causes the load to function and causes the substance to change from the fourth temperature to a fifth temperature, with the fifth temperature being warmer than the fourth temperature, and
where the input component is configured to cause the substance at the fifth temperature to cycle back, by way of the physical loop, to the reaction chamber.

18. The system of claim 17,
where the third temperature is about equal to the first temperature and
where the fifth temperature is about equal to the third temperature.

19. The system of claim 18,
where the loop is a first loop,
where the output component is configured to manage a second loop that supplied a refrigerant from a heat exchanger to the load based on a determination that the substance is not at a sufficient temperature to cool the load to a desired level,
where the heat exchanger is separate and distinct from the fuel processor, and
where the refrigerant cools the load with the substance.

20. The fuel controller of claim 19,
where the load is a laser and
where the fourth temperature is about equal to the second temperature.

* * * * *